(12) United States Patent
Seo et al.

(10) Patent No.: US 7,751,685 B2
(45) Date of Patent: Jul. 6, 2010

(54) RECORDING MEDIUM HAVING DATA STRUCTURE INCLUDING GRAPHIC DATA AND RECORDING AND REPRODUCING METHODS AND APPARATUSES

(75) Inventors: Kang Soo Seo, Kyunggi-do (KR); Byung Jin Kim, Kyunggi-do (KR); Hyung Sun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 979 days.

(21) Appl. No.: 10/880,645

(22) Filed: Jul. 1, 2004

(65) Prior Publication Data
US 2005/0025452 A1 Feb. 3, 2005

(30) Foreign Application Priority Data
Jul. 2, 2003 (KR) .................... 10-2003-0044480

(51) Int. Cl.
*H04N 5/91* (2006.01)
*H04N 7/26* (2006.01)
*H04N 5/00* (2006.01)
*H04N 7/00* (2006.01)

(52) U.S. Cl. ................... 386/65; 386/46; 386/95; 386/124; 386/125; 386/126

(58) Field of Classification Search ........... 386/95, 386/46, 65, 124, 125, 126; 345/629
See application file for complete search history.

(56) References Cited

U.S. PATENT DOCUMENTS 4,439,759 A 3/1984 Fleming et al.
5,539,716 A 7/1996 Furuhashi
5,636,631 A 6/1997 Waitz et al.
5,748,256 A 5/1998 Tsukagoshi (Continued)

FOREIGN PATENT DOCUMENTS

CN 1151586 6/1997

(Continued)

OTHER PUBLICATIONS

Yahata et al., U.S. Appl. No. 60/483,228, filed Jun. 30, 2003.*

(Continued)

*Primary Examiner*—Thai Tran
*Assistant Examiner*—Hung Q Dang
(74) *Attorney, Agent, or Firm*—Harness, Dickey & Pierce, P.L.C.

(57) ABSTRACT

The present invention relates to a recording medium having data structure including graphic data to be used for a menu page etc. of main video data recorded thereon as well as methods and apparatuses for reproducing and recording the data structure. A recording medium of the present invention comprises: a main data stream including at least video data; and a graphic data stream being used for graphic presentation for the recorded main data stream, wherein the graphic data stream includes at least one display set; the display set includes at least one composition segment and at least two definition segments; and a decoding time stamp written in a definition segment within the display set is equal to or greater than a presentation time stamp written in a preceding definition segment.

25 Claims, 11 Drawing Sheets

U.S. PATENT DOCUMENTS

| | | |
|---|---|---|
| 5,758,007 A | 5/1998 | Kitamura et al. |
| 5,841,447 A | 11/1998 | Drews |
| 5,912,710 A | 6/1999 | Fujimoto |
| 5,917,830 A | 6/1999 | Chen et al. |
| 5,923,627 A | 7/1999 | Miwa et al. |
| 5,929,857 A | 7/1999 | Dinallo et al. |
| 5,963,704 A | 10/1999 | Mimura et al. |
| 5,999,160 A | 12/1999 | Kitamura et al. |
| 6,009,234 A | 12/1999 | Taira et al. |
| 6,035,055 A | 3/2000 | Wang et al. |
| 6,046,778 A | 4/2000 | Nonomura et al. |
| 6,072,832 A | 6/2000 | Katto |
| 6,088,507 A | 7/2000 | Yamauchi et al. |
| 6,112,011 A | 8/2000 | Hisatomi |
| 6,115,529 A | 9/2000 | Park |
| 6,122,436 A * | 9/2000 | Okada et al. ............ 386/126 |
| 6,134,383 A | 10/2000 | Kikuchi et al. |
| 6,167,189 A | 12/2000 | Taira et al. |
| 6,167,192 A | 12/2000 | Heo |
| 6,167,410 A | 12/2000 | Imamura |
| 6,204,883 B1 | 3/2001 | Tsukagoshi |
| 6,226,446 B1 | 5/2001 | Murase et al. |
| 6,233,393 B1 | 5/2001 | Yanagihara et al. |
| 6,246,402 B1 | 6/2001 | Setogawa et al. |
| 6,246,790 B1 | 6/2001 | Huang et al. |
| 6,286,001 B1 | 9/2001 | Walker et al. |
| 6,330,210 B1 | 12/2001 | Weirauch et al. |
| 6,335,742 B1 | 1/2002 | Takemoto |
| 6,366,732 B1 | 4/2002 | Murase et al. |
| 6,393,196 B1 | 5/2002 | Yamane et al. |
| 6,433,801 B1 * | 8/2002 | Moon et al. ............ 715/840 |
| 6,445,877 B1 | 9/2002 | Okada et al. |
| 6,470,460 B1 | 10/2002 | Kashiwagi et al. |
| 6,483,983 B1 | 11/2002 | Takahashi et al. |
| 6,504,996 B1 | 1/2003 | Na et al. |
| 6,539,166 B2 | 3/2003 | Kawamura et al. |
| 6,553,180 B1 | 4/2003 | Kikuchi et al. |
| 6,574,417 B1 | 6/2003 | Lin et al. |
| 6,707,459 B1 | 3/2004 | Graves et al. |
| 6,711,287 B1 | 3/2004 | Iwasaki |
| 6,724,981 B1 | 4/2004 | Park et al. |
| 6,728,477 B1 | 4/2004 | Watkins |
| 6,792,154 B1 | 9/2004 | Stewart |
| 6,847,777 B1 | 1/2005 | Nakamura |
| 6,850,228 B1 | 2/2005 | Parks et al. |
| 6,871,008 B1 | 3/2005 | Pintz et al. |
| 6,889,001 B1 | 5/2005 | Nikaido et al. |
| 7,072,401 B2 | 7/2006 | Kim et al. |
| 7,167,637 B2 | 1/2007 | Mori et al. |
| 7,236,687 B2 | 6/2007 | Kato et al. |
| 2001/0036322 A1 | 11/2001 | Bloomfield et al. |
| 2001/0052127 A1 | 12/2001 | Seo et al. |
| 2002/0006165 A1 | 1/2002 | Kato |
| 2002/0006273 A1 | 1/2002 | Seo et al. |
| 2002/0089516 A1 | 7/2002 | Sobol |
| 2002/0174430 A1 | 11/2002 | Ellis et al. |
| 2002/0194618 A1 | 12/2002 | Okada et al. |
| 2003/0152365 A1 | 8/2003 | Nagayama |
| 2003/0179900 A1 | 9/2003 | Tian et al. |
| 2004/0047591 A1 | 3/2004 | Seo et al. |
| 2005/0045481 A1 | 3/2005 | Kawaguchi et al. |
| 2006/0045481 A1 | 3/2006 | Yahata et al. |
| 2006/0064716 A1 | 3/2006 | Sull et al. |
| 2006/0143666 A1 | 6/2006 | Okada et al. |
| 2006/0153535 A1 | 7/2006 | Chun et al. |
| 2006/0165388 A1 | 7/2006 | Uesaka et al. |
| 2006/0188223 A1 * | 8/2006 | Ikeda et al. ............ 386/95 |
| 2006/0282775 A1 * | 12/2006 | Yahata et al. ............ 715/716 |
| 2007/0057969 A1 * | 3/2007 | McCrossan et al. ........ 345/629 |
| 2007/0133948 A1 | 6/2007 | Kikuchi et al. |

FOREIGN PATENT DOCUMENTS

| | | |
|---|---|---|
| CN | 1167311 | 12/1997 |
| CN | 1177172 | 3/1998 |
| CN | 1242575 | 1/2000 |
| CN | 1251461 | 4/2000 |
| CN | 1745579 | 3/2006 |
| CN | 101026775 | 8/2007 |
| EP | 0782338 | 7/1997 |
| EP | 0 831 647 | 3/1998 |
| EP | 0 724 264 | 12/1998 |
| EP | 0 898 279 | 2/1999 |
| EP | 0 913 822 | 5/1999 |
| EP | 1 021 048 | 7/2000 |
| EP | 1 223 580 | 7/2002 |
| EP | 1 608 165 | 12/2005 |
| EP | 1 868 190 | 12/2007 |
| JP | 6319125 | 11/1994 |
| JP | 8298554 | 11/1996 |
| JP | 8329004 | 12/1996 |
| JP | 8339663 | 12/1996 |
| JP | 10-215409 | 8/1998 |
| JP | 11-018048 | 1/1999 |
| JP | 11-185463 | 7/1999 |
| JP | 11-298860 | 10/1999 |
| JP | 2000-083216 | 3/2000 |
| JP | 2000-100073 | 4/2000 |
| JP | 2000-132953 | 5/2000 |
| JP | 2000-222861 | 8/2000 |
| JP | 2000-261802 | 9/2000 |
| JP | 2001-184839 | 7/2001 |
| JP | 2001-312880 | 11/2001 |
| JP | 2002-056651 | 2/2002 |
| JP | 2002-067533 | 3/2002 |
| JP | 2002-153684 | 5/2002 |
| JP | 2002-344805 | 11/2002 |
| JP | 2003-009096 | 1/2003 |
| KR | 10-1994-0038268 | 12/1994 |
| KR | 10-1992-0024627 | 12/1997 |
| KR | 10-2001-0111247 | 12/2001 |
| KR | 10-2002-0064463 | 8/2002 |
| RU | 2129758 | 4/1999 |
| RU | 2323489 | 4/2008 |
| WO | WO 00/30357 | 5/2000 |
| WO | WO 00/30358 | 5/2000 |
| WO | WO 00/31980 | 6/2000 |
| WO | WO 00/36600 | 6/2000 |
| WO | WO 00/60598 | 10/2000 |
| WO | WO 2004/098193 | 11/2004 |
| WO | WO 2004/114658 A1 | 12/2004 |
| WO | WO 2005/002220 A1 | 1/2005 |
| WO | WO 2005/052941 A1 | 6/2005 |
| WO | WO 2005/078727 A1 | 8/2005 |

OTHER PUBLICATIONS

European Telecommunication Standard: Digital Video Broadcasting (DVB); Subtitling Systems, ETS 300 743, Sep. 1997, European Telecommunications Standards Institute, pp. 1-45.*
International Search Report for corresponding International Application No. PCT/KR2004/001593 dated Sep. 30, 2004.
Office Action for counterpart Russian patent application No. 2005132412/28(036320) dated May 5, 2008.
Office Action for counterpart U.S. Appl. No. 10/673,210 dated Jun. 13, 2008.
"Digital Video Broadcasting (DVB); subtitling systems," Final Draft ETSI EN 300 743 v1.2.1 (Jun. 2002), pp. 1-48.
Search Report for counterpart European patent application No. 04748368.0-2223/1642286 dated Sep. 1, 2008.
P. Sarginson, "MPEG-2: A Tutorial Introduction to the Systems Layer," The Institution of Electrical Engineers, 1995, pp. 1-13.

Search Report for counterpart European patent application No. 04737126.5-2223/1642284 dated Sep. 1, 2008.

Office Action for counterpart U.S. Appl. No. 10/831,171 dated Jul. 22, 2008.

Office Action for counterpart U.S. Appl. No. 10/879,079 dated Aug. 20, 2008.

Office Action for counterpart Chinese patent application No. 200480018833.5 dated Aug. 1, 2008.

Office Action for counterpart Chinese patent application No. 200480018832.0 dated Aug. 1, 2008.

Office Action for counterpart U.S. Appl. No. 10/673,212 dated Oct. 16, 2008.

Office Action for counterpart U.S. Appl. No. 10/920,173 dated Oct. 28, 2008.

Notice of Allowance for Russian patent application No. 2006102853/28 dated Jun. 22, 2009.

* cited by examiner

Interactive Compostion Segment Syntax

```
Interactive_page_composition_segment ( ) {
        sync_byte
        segmet_type
        reserved
        segment_length
        page_time_out_pts
        selection_time_out_pts
        UO_mask
        page_version_number
        page_state
        ref_to_CLUT_id
        reserved_for_byte_align
        number_of_button_entries
        animation_frame_rate_code
        default_selected_button_number
        default_activated_button_number
        number_of_windows (//number_of_windows <=99)
        for (window_id=0; window_id < number_of_windows;i++){
                        window_horizontal_address
                        window_vertical_address
                        window_width
                        window_height
        }
        for (i=0; i < number_of_button_entries; i++){
                        button_number
                        numberically_selectable_flag
                        auto_action_falg
                        reserved
                        neighbour_info () {
                                    upper_button_number
                                    lower_button_number
                                    left_button_number
                                    right_button_number
                        }
                        normal_state_info(){
                                    start_object_id_normal
                                    end_object_id_normal
                                    repeat_normal_flag
                        }
                        selected_state_info(){
                                    start_object_id_selected
                                    end_object_id_selected
                                    repeat_selected_flag
                        }
                        actioned_state_info(){
                                    start_object_id_activated
                                    end_object_id_activated
                                    repeat_actioned_flag
                        }
                        num_of_button_commands
                        for(command_id=0;
                            command_id < num_of_button_commands;
                            command_id ++) {
                                    button_command_id ++) {
                        }
        }
}
```

FIG. 4
CLUT_Definition Segment_Syntax

```
CLUT_definition_segment () {
        sync_type
        segment_type
        reserved
        segment_length
        CLUT_id
        reserved
        for (color_index=0; color_index <256; color_index++)
                CLUT_entry_id
                Y-value
                Cr-value
                Cb-value
                T-value
                }
        }
}
```

FIG. 5
Object Definition Segment_Syntax

```
Object_definition_segment ( ) {
        sync_byte
        segment_type
        reserved
        segment_length
        last_in_sequence
        reserved
        object_data_piece ( ) {
                object_id
                reserved
                object_width
                object_height
                do{ run_length_code
                    } while (run_length_code ! = '00000000 0000000 '
        }
}
```

FIG. 6
End of Display set Segment_Syntax

```
end_of_display_set_segment () {
        sync_byte
        segment_type
        reserved
        segment_length
}
```

Page Compostion Segment Syntax

```
page_composition_segment () {
        sync_byte
        segment_type
        reserved
        segment_length
        page_time_out
        page_version_number
        page_state
        ref_to_CLUT_id
        reserved
        number_of_object_entries
        if (i=0; i<unmber_of_object_entries; i++) {
                ref_to_object_id
                is_object_crpping
                ref_to_window_id
                object_horizontal_address
                object_verticall_address
                if (is_object_cropping) {
                        object_horizontal_cropping
                        object_verticall_cropping
                        object_cropping_width
                        object_cropping_height
                }
        }
}
```

DTS_ODS 2    DTS_ODS 1 (equal to or greater than PTS_ODS2)
PTS_ODS 2    PTS_ODS 1

RECORDING MEDIUM HAVING DATA STRUCTURE INCLUDING GRAPHIC DATA AND RECORDING AND REPRODUCING METHODS AND APPARATUSES

FOREIGN PRIORITY

The present invention claims priority under 35 U.S.C. 119 on Korean Application No. 10-2003-044480 filed Jul. 2, 2003; the contents of which are incorporated by reference in their entirety.

BACKGROUND OF THE INVENTION

1. Field of the Invention

The present invention relates to a recording medium having data structure including graphic data to be used for a menu page etc. of main video data recorded thereon as well as methods and apparatuses for reproduction and recording the data structure.

2. Description of the Related Art

High-density optical disks such as DVDs (Digital Versatile Disk) capable of storing large amounts of high-quality digital video/audio data have been widely used. In addition, optical disk apparatuses using the DVD, for example, DVD players or DVD recorders are also widely used.

In general, the DVD includes subtitle data such as caption or logo as well as main video data recorded thereon. The subtitle data, which is graphic data, is presented along with the main video data. That is, the optical disk apparatus reads main video data and subtitle data and combines them to successive video frames where subtitle data is overlapped. The successive video frames are displayed onto an external displaying apparatus, e.g., a television set. Consequently, a user can view main video reproduced from the DVD with captions or logos of subtitle data.

In the meantime, an optical disk with higher density than the DVD is being standardized among related companies. A BD-ROM (Blu-ray Disk ROM) is an example of the higher-density optical disk. The BD-ROM also needs auxiliary graphic data to be used for selection of reproduction control and/or for additional information display besides main video data recorded thereon. Therefore, how to record such auxiliary graphic data to ensure its effective display to a user in reproduction is an issue in the standardization.

SUMMARY OF THE INVENTION

It is an object of the present invention to provide a recording medium having auxiliary graphic data whose recording structure is to ensure user-friendly display thereof, and methods and apparatuses for recording and reproducing the graphic data on such a recording medium.

It is another object of the present invention to provide a graphic data structure being capable of reducing delay time in graphics presentation.

It is still another object of the present invention to provide a graphic data structure to ensure sequential decoding of ODSs without overflows to an optical disk apparatus equipped with only one graphic decoder.

A recording medium having recorded graphic data structured according to the present invention, comprises: a main data stream including at least video data; and a graphic data stream being used for graphic presentation for the recorded main data stream, wherein the graphic data stream includes at least one display set, the display set includes at least one composition segment and at least one definition segment, and a presentation time stamp written in the composition segment is greater than a presentation time stamp written in the definition segment.

Another recording medium having recorded graphic data structured according to the present invention, comprises: a main data stream including at least video data; and a graphic data stream being used for graphic presentation for the recorded main data stream, wherein the graphic data stream includes at least one display set; the display set includes at least one composition segment and at least two definition segments; and a decoding time stamp written in a definition segment in the display set is equal to or greater than a presentation time stamp written in a preceding definition segment.

In one embodiment, the composition segment is interactive composition segment to be used for composition of menu screens.

In another embodiment, a presentation time stamp of the composition segment is greater than a presentation time stamp of a first object definition segment among the plurality of object definition segments.

In yet another embodiment, a presentation time stamp of the composition segment is not smaller than a presentation time stamp of a last object definition segment among the plurality of object definition segments.

In still yet another embodiment, a display set is recorded such that DTS (Decoding Time Stamp) written in an arbitrary ODS (Object Definition Segment) in the display set shall be not smaller than PTS (Presentation Time Stamp) written in another ODS preceding the arbitrary ODS.

In still yet another embodiment, a first ODS of two consecutive ODSs is placed before a second ODS in a display set if decoding and transfer time of the first ODS is longer than that of the second ODS.

The present invention further provides apparatuses and methods for recording and reproducing the data structure of graphic data according to the present invention, and recording and reproducing according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, exemplary embodiments thereof will now be described with reference to the accompanying drawings.

The data structures according to the present invention comprise navigation information for managing presentation of auxiliary graphic data recorded on the recording medium.

The data structures writing according to the present invention may be applicable to the manufacturing process in case of a read-only disk like BD-ROM.

The auxiliary graphic data is recorded on a recording medium in accordance with the present invention besides main video data. There are two types of the auxiliary graphic data. One type is presentation graphic data for embodying ordinary graphics such as subtitles and the other is interactive graphic data to compose menu pages etc. for user interfacing. The basic syntactic element of the graphic data is called 'Segment' that is corresponding to a single PES (Packetized Elementary Stream) packet. Some segments are grouped to a display set that will compose a completed screen of graphics called 'Display Update'.

Figure 1:
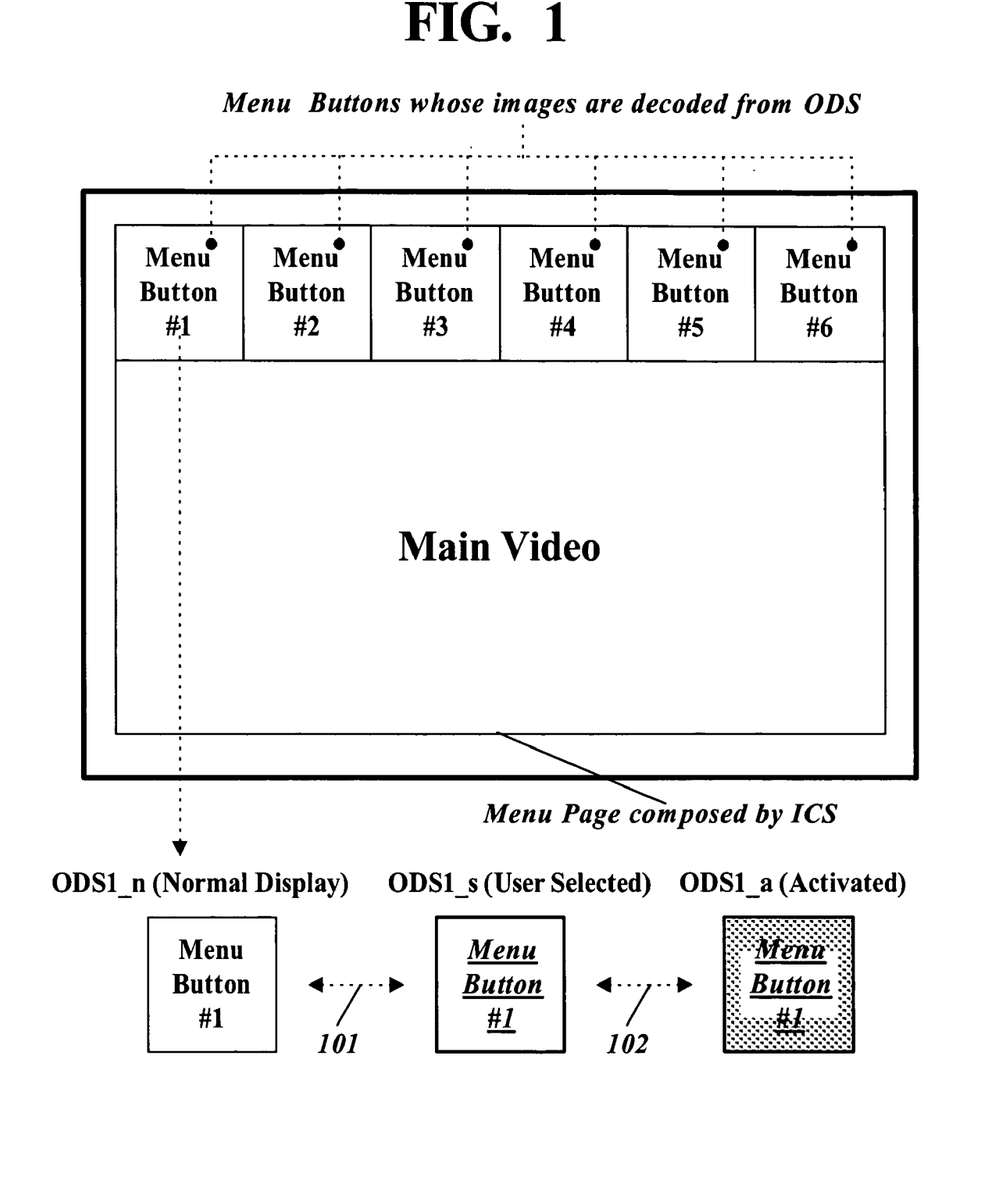
FIG. 1 shows an example of displayed screen where interactive graphic data is presented.

FIG. 1 shows an example of displayed screen where interactive graphic data is presented. The display example of FIG. 1 is presented by processing an ICS (Interactive Composition Segment) having at least one menu page including information on six menu buttons. An image for each button is written in an ODS (Object Definition Segment). Because the menu button information in ICS has ID of an associated object, an object in ODS whose ID is designated by the menu button information is presented as the button. In addition, the menu button information has different object IDs for different states of same button, so that different images can be displayed for different states of same button (101,102).

Figure 2A:
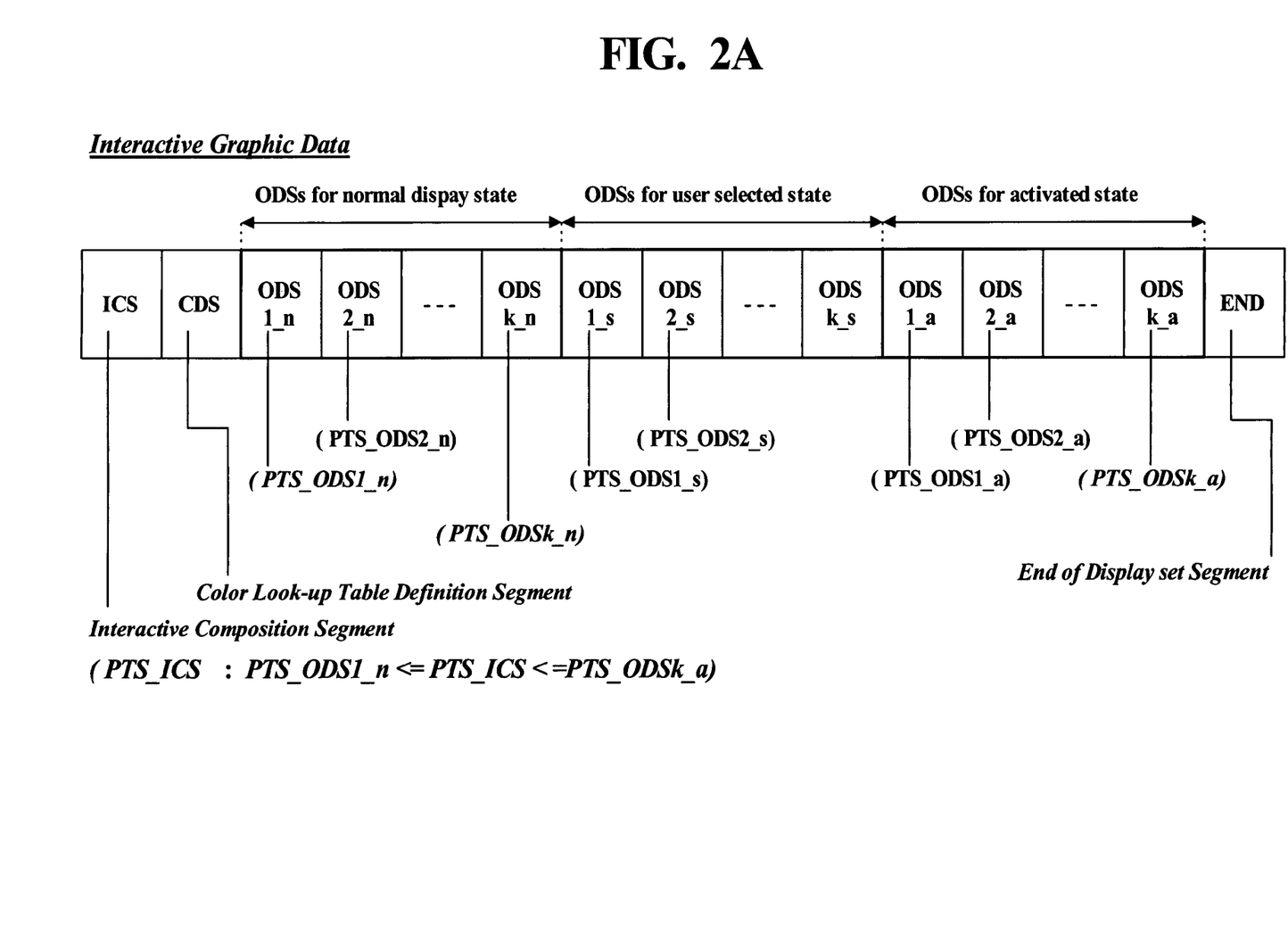
FIG. 2A illustrates a data structure of interactive graphic data, which will be displayed like FIG. 1, recorded on a recording medium in accordance with the present invention.

FIG. 2A illustrates a data structure of graphic data recorded on a recording medium in accordance with the present invention. The data structure of FIG. 2A will be displayed later as shown in FIG. 1. In the data structure of FIG. 2A, the first segment is ICS that includes information about menu pages and all buttons included in the pages, the second is CDS (Color lookup table Definition Segment) that defines palette for graphic planes, and successive ODSs follow the CDS. Each ODS includes information and actual graphic data for objects, e.g., buttons to be displayed on menu pages. The last object is END (End of Display set segment) to indicate the end of a display set. The plurality of ODSs may be arranged in order of normal, selected, and activated state as illustrated in FIG. 2A.

Figure 2B:
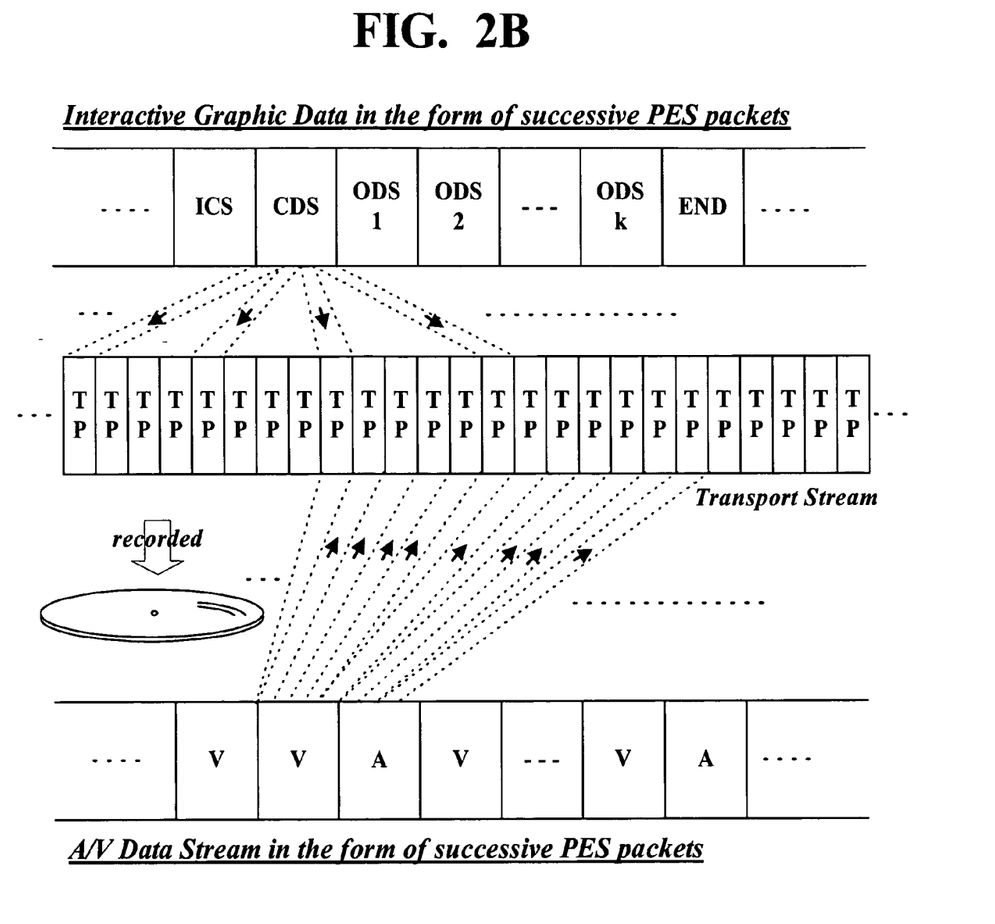
FIG. 2B shows schematic recording scheme of a main video data stream and an auxiliary graphic data stream.

The graphic data structured as shown in FIG. 2A in accordance with the present invention is interleaved with main video data on a recording medium as illustrated in FIG. 2B. For such interleaving, a series of PES packets constituting the graphic data stream and another series of PES packets constituting the main video data stream are all sliced and then every slice is packetized to a transport packet. Then, the transport packets of the main video data and the graphic data are multiplexed and recorded on a recording medium.

Each source packet, namely, each PES packet corresponding to each segment has PTS (Presentation Time Stamp) in its header to be used for presentation time control and DTS (Decoding Time Stamp) in its header to be used for decoding time control. By the way, the PTS to be written in each PES packet is subject to the following constraint in accordance with the present invention.

The PTS 'PTS_ICS' in a PES packet of ICS must be greater than the PTS 'PTS_ODS1_n' in a PES packet of the first ODS 'ODS 1_n' that will be decoded first among ODSs. This constraint is to ensure that ICS is processed after decoding of graphic data of at least the first ODS is completed and then buffered.

The DTS and PTS to be written respectively in two PES packets, corresponding to successive two ODSs, are also subject to another constraint in accordance with the present invention. This DTS-PTS constraint will be explained in detail later.

The PTS of ICS may be smaller than the PTS 'PTS_ODSk_n' of the last ODS in normal-state ODSs which will be displayed last in the display set or smaller than PTS 'PTS_ODSk_a' of the last ODS in the display set, namely, the last ODS 'ODS k_a' that includes image data for the activated-state objects.

If the PTS in a PES packet corresponding to the ICS is greater than PTS in another PES packet of the first ODS, namely PTS_ICS>PTS_ODS1_n, and is smaller than PTS of another PES packet of the normal-state last ODS 'ODS k_n', namely, PTS_ICS<PTS_ODSk_n, an optical disk apparatus being capable of reproducing the auxiliary graphic data recorded as above can display a menu page including at least one menu button because there is a bitmapped menu button image already decoded from an ODS whose PTS precedes the ICS when the ICS is processed.

If the PTS in a PES packet corresponding to the ICS is equal to or greater than PTS in another PES packet of the last ODS 'ODS k_a', the optical disk apparatus can display a menu page including all menu buttons at a time because all the bitmapped menu button images have been decoded from ODSs (ODS 1_n, ODS 2_n ..., ODS k_n, ..., ODS_k_a) and are ready when the ICS is processed.

Consequently, a complete menu screen including necessary all menu buttons can be provided for a user very rapidly.

On the other hand, the PTS 'in a PES packet corresponding to the ICS is equal to or greater than PTS 'PTS_ODSk_n' in another PES packet of the normal-state last ODS 'ODS k_n' or is equal to or greater than PTS 'PTS_ODSk_s' in another PES packet of the selected-state last ODS 'ODS k_s'.

Figure 3:
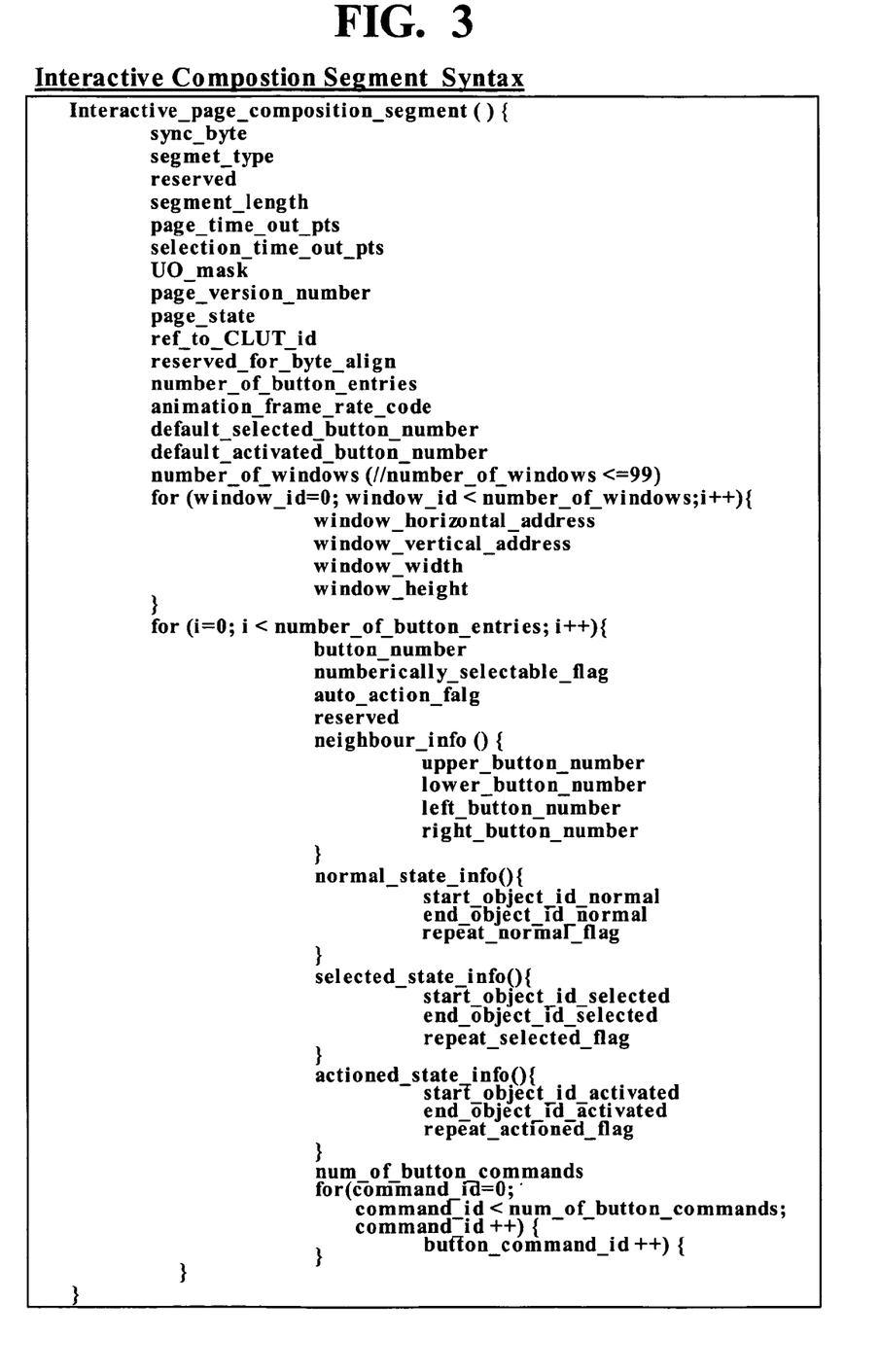
FIG. 3 shows syntax of an interactive composition segment.

The ICS has the syntactic structure shown in FIG. 3. The ICS includes table elements such as page time-out PTS 'page_time_out_pts', selection time-out PTS 'selection_time_out_pts', and CLUT (Color Look_Up Table) ID 'ref_to_CLUT_id' to point to an associated CLUT.

The ICS also has information on all buttons to be displayed onto its menu pages as given in FIG. 3. There are three types in the button information. The first type is for normal state, the second for selected state and the third for activated state. The normal state button information 'normal_state_info' includes ID of start object 'start_object_id_normal' and ID of end object 'end_object_id_normal'. The selected state button information 'selected_state_info' includes ID of start object 'start_object_id_selected' and ID of end object 'end_object_id_selected'. The activated state button information includes ID of start object 'start_object_id_activated' and ID of end object 'end_object_id_activated'.

If the IDs of start and end object are different each other, the objects from the start to the end inclusive are displayed sequentially to show animated display. The animation display rate is defined by the field of animation frame rate code 'animation_frame_rate_code'.

Figure 4:
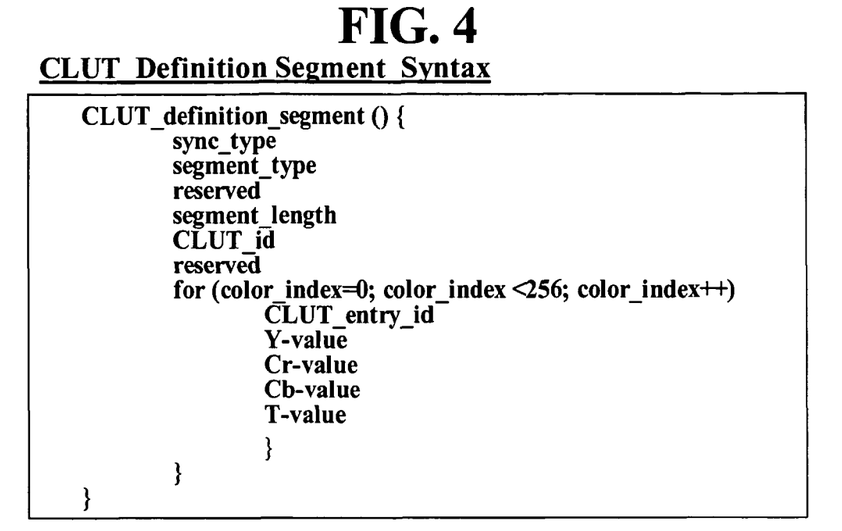
FIG. 4 shows syntax of a color look-up table definition segment.

The CDS has the syntactic structure shown in FIG. 4. The CDS includes table elements such as sync byte 'sync_byte', type of segment 'segment_type', length of segment 'segment_length', ID of CLUT 'CLUT_id', and, for each color index, ID of CLUT entry 'CLUT_entry_id', luminance value 'Y-value', red-chrominance value 'Cr-value', blue-chrominance value 'Cb-value', and transparency value 'T-value'.

Figure 5:
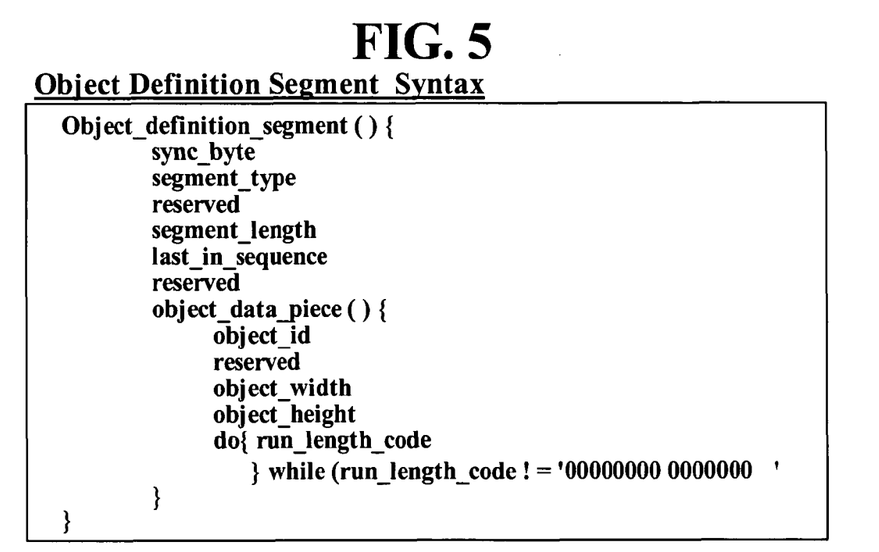
FIG. 5 shows syntax of an object definition segment.

FIG. 5 shows the syntactic structure of the ODS. The ODS includes sync byte 'sync_byte', type of segment 'segment_type', length of segment 'segment_length', a plurality of object data pieces 'object_data_piece', and so on. Each of the object data pieces includes object ID 'object_id', width of an object 'object_width', height of an object 'object_height', and run-length code field 'run_length_code' where graphic data pertaining to object is encoded.

Figure 6:
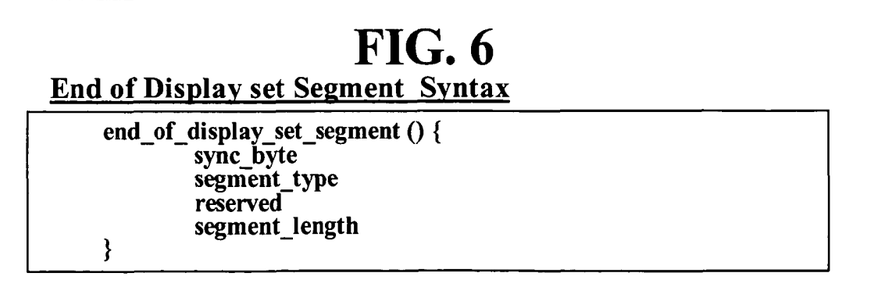
FIG. 6 shows syntax of a display set end segment.

FIG. 6 shows the syntactic structure of the END. The END includes sync byte 'sync_byte', type of segment 'segment_type', and length of segment 'segment_length'.

Figure 7:
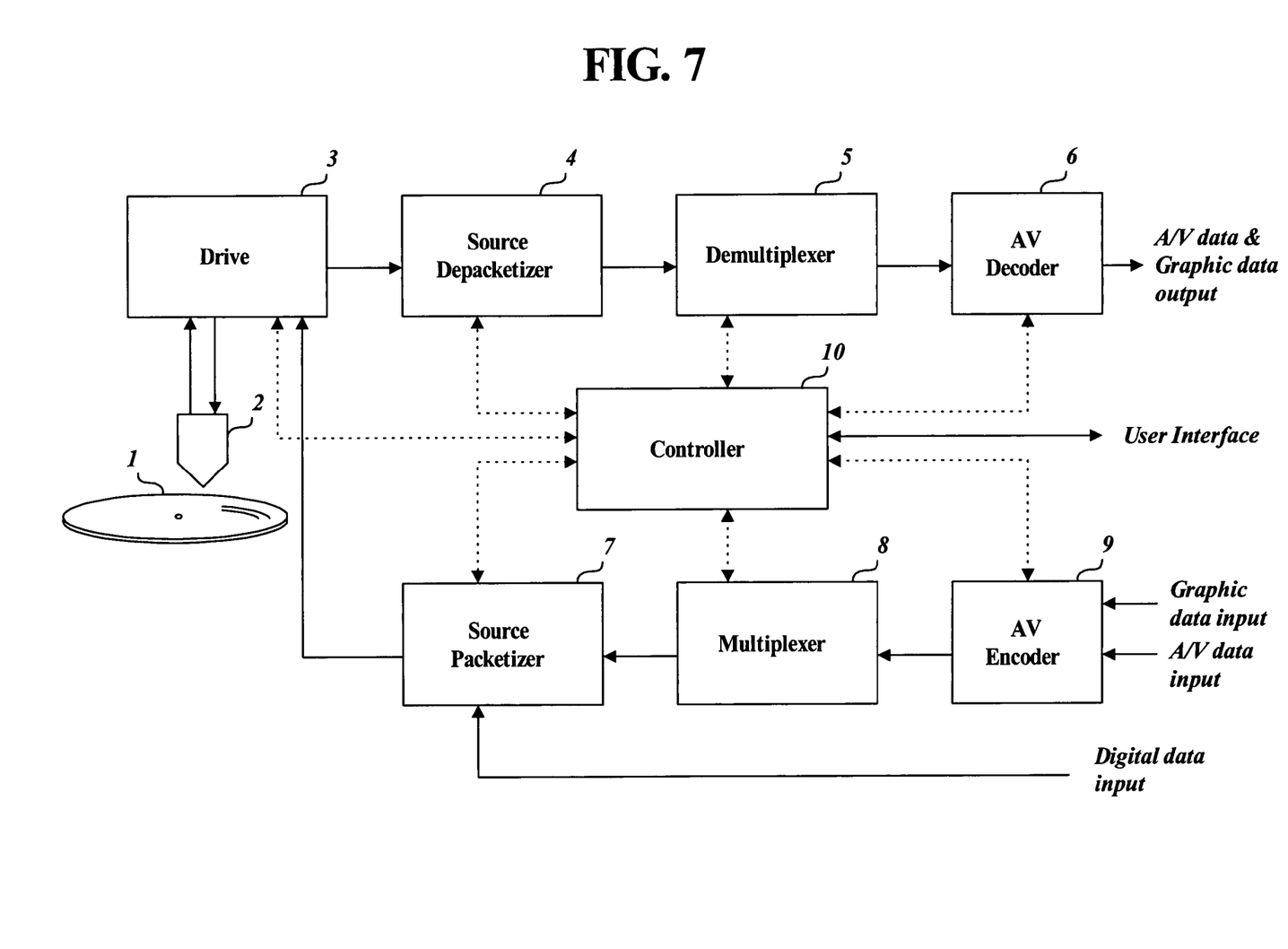
FIG. 7 illustrates a schematic diagram of an embodiment of an optical disk recording and reproducing apparatus according to the present invention.

FIG. 7 illustrates a schematic diagram of an embodiment of an optical disk recording and reproducing apparatus according to the present invention. As shown, an AV encoder 9 receives and encodes audio and video data and/or auxiliary graphic data. The AV encoder 9 outputs the encoded audio and video data along with coding information and stream attribute information. A multiplexer 8 multiplexes the encoded audio and video data and the graphic data based on the coding information and stream attribute information to create, for example, an MPEG-2 transport stream consisting of successive transport packets. A source packetizer 7 packetizes the transport packets from the multiplexer 8 into source packets in accordance with the audio/video format (and/or graphic data format) of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type (A/V or graphic data) of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation information for managing reproduction of the audio/video data and graphic data being recorded on the optical disk. For example, based on information received via the user interface (e.g., instruction set saved on disk, provided over an intranet or internet by a computer system, etc.) the controller 10 controls the drive 3 to record necessary management data.

In addition, the controller 10 controls encoding process of the AV encoder 9 such that the graphic data is structured in FIGS. 2A and 2B and 3 to 6.

Especially, the controller instructs the AV encoder 9 to write PTSs in each header of encoded PES packets such that PTS for an ICS is equal to or greater than PTS for the normal-state last ODS 'ODS k_n', the selected-state last ODS 'ODS k_s', or the activated last ODS 'ODS k_a'.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video and/or graphic data source packets from the optical disk. For example, the user input may specify a title to reproduce from a title domain or a menu from menu domain. This user input may be specified, for example, via a menu based graphical user interface pre-programmed into the controller 10 or via menu buttons included in a menu composed by processing of a certain ICS at user's request. Using the user input and the navigation information reproduced from the optical disk, the controller 10 controls the reproduction of a title. For receiving the user inputs, the controller 10 reads and processes the auxiliary graphic data recorded on the optical disk to compose a menu screen, as explained above in detail.

The reproduced source packets are received by a source depacketizer 4 and converted into a data stream (e.g., an MPEG-2 transport stream). A demultiplexer 5 demultiplexes the data stream into encoded video and audio data and/or graphic data. An AV decoder 6 decodes the encoded data to produce the original audio and video data and/or graphic data that was feed to the AV encoder 9. The graphic data is processed when a menu is requested from a user. In the graphic data processing, normal state ODSs are decoded and stored in a buffer (not figured) before processing ICS because the normal state ODSs precede the IDS in PTS. A complete menu screen is composed with the already-decoded button images stored in the buffer by execution of the ICS. After processing the ICS, the controller 10 knows the relations among buttons and among menu pages and other button-related operation information. Therefore, the controller 10 can conduct an operation associated with a selected button or an execution-requested button. In the event that a button is selected or activated, an already-decoded graphic image of the button object in corresponding state ODS (ODS 1_s, . . . , ODS k_s, ODS 1_a, . . . , or ODS k_a) stored in the buffer replaces the normal state button image in the displayed menu page.

During the reproduction of audio/video data and graphic data, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform and on menu page composition, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
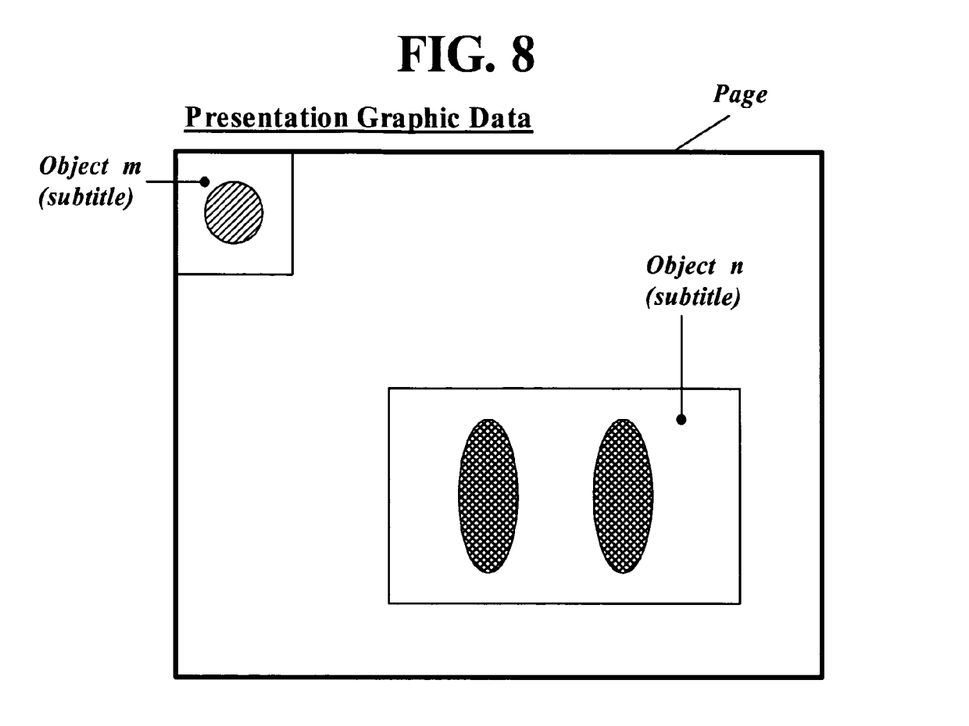
FIG. 8 shows an example of displayed screen where subtitle graphic data is presented.

In the meantime, the BD-ROM can store presentation graphic data to be used not for user interfacing but for information display. FIG. 8 illustrates such a graphic page.

In the display example of FIG. 8, two subtitle objects (Objects #m, #n) are displayed thereon. Information of the objects is included in a PCS (Page Composition Segment), color information therefor is included in a CDS, and bit-mapped images thereof is included in ODSs. In the page of FIG. 8, a video scene decoded from main video data reproduced from a BD-ROM may be displayed onto a screen area where the subtitle objects are not displayed.

Figure 9:
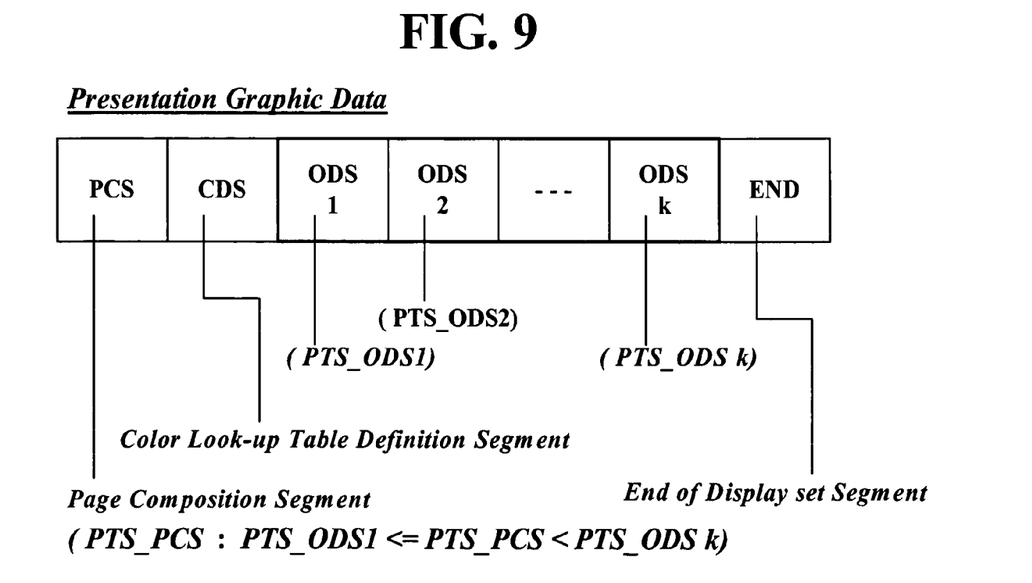
FIG. 9 illustrates a data structure of subtitle graphic data, which will be displayed like FIG. 8, recorded on a recording medium in accordance with the present invention.

FIG. 9 illustrates the structure of graphic data to compose a subtitle graphic page like FIG. 8. In the data structure of FIG. 9, the first segment is PCS that includes information for a graphic page and all objects to be included in the page, the second is CDS that defines palette for the graphic plane, and at least one ODS follows the CDS. Each ODS includes bit-mapped graphic data for the objects to be displayed on the subtitle graphic page. The last object is END (End of Display set segment) to indicate end of a display set.

Each source packet, namely, each PES packet corresponding to each segment has PTS (Presentation Time Stamp) to be used for presentation time control and DTS (Decoding Time Stamp) to be used for decoding time control. By the way, the PTS to be written in each PES packet is subject to the following constraint in accordance with the present invention.

The PTS 'PTS_PCS' in a PES packet of PCS must be greater than the PTS 'PTS_ODS 1' in a PES packet of the first ODS that will be displayed first among ODSs. This constraint is to guarantee that PCS is processed after graphic data of at least the first ODS is decoded and buffered.

If the PTS in a PES packet corresponding to the PCS is greater than PTS in another PES packet of the first ODS, namely PTS_PCS>PTS_ODS 1, and is smaller than PTS of another PES packet of the last ODS, namely, PTS_ICS<PTS_ODS k, the optical disk apparatus being capable of reproducing the auxiliary graphic data recorded as above can display a graphic page including at least one object image because there is bitmapped image data decoded from an ODS whose PTS precedes the PCS when the PCS is processed.

For example, if the PTS 'PTS_PCS' in a PES packet corresponding to the PCS is equal to PTS 'PTS_ODS 2' in another PES packet of the second ODS 'ODS 2', the optical disk apparatus can compose and display a graphic page specified by the PCS with decoded bitmapped object images the moment or just after the first and the second ODS (ODSs 1 and 2) are decoded.

Figure 10:
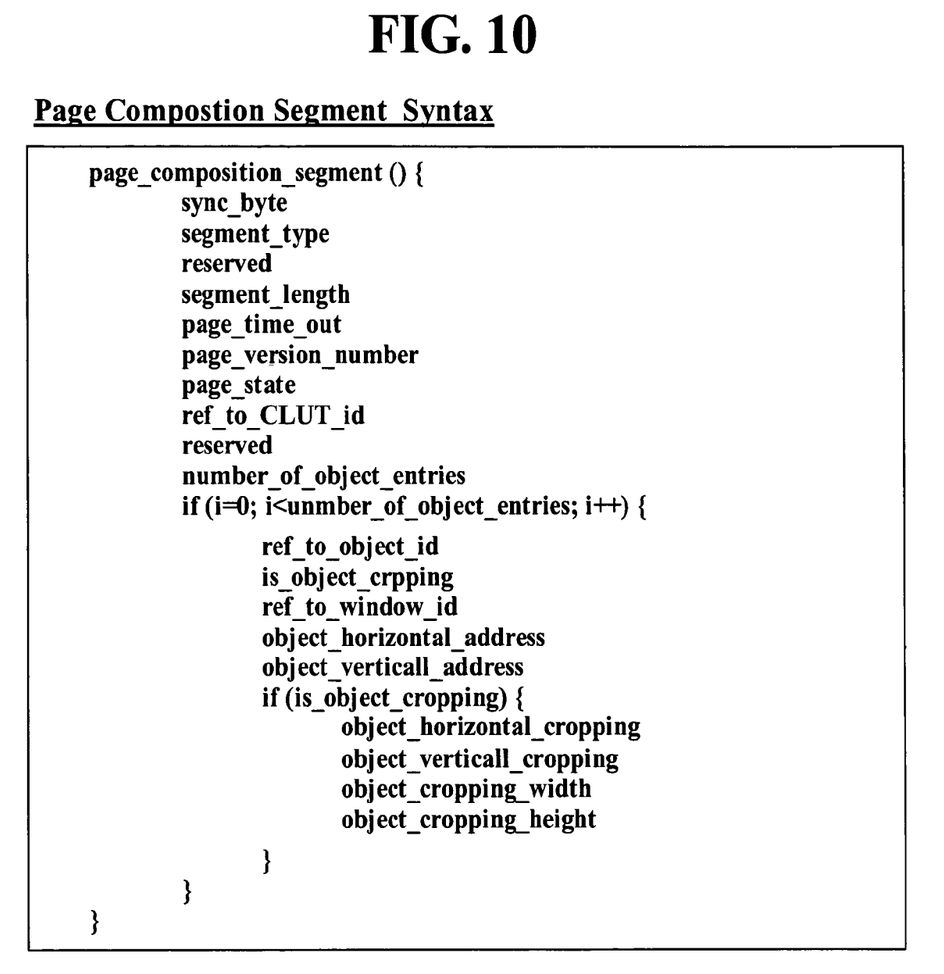
FIG. 10 shows syntax of a page composition segment.

The PCS has the syntactic structure shown in FIG. 10. The PCS includes table elements such as page time-out information 'page_time_out', page state information 'page_state', and CLUT ID 'ref_to_CLUT_id' to point to an associated CLUT. The PCS also includes other information fields for linking graphic objects in ODSs and their presentation control.

The above explanation about operation of the recording/reproducing apparatus given in FIG. 7 is also applicable to the data structures shown in FIGS. 9 and 10 except that a graphic page has graphic objects without interactive menu buttons.

DTS and PTS writing in segments and segment arrangement in a display set in accordance with the present invention are explained in detail hereinafter.

According to DTS-PTS constraint of the present invention, DTS to be written in an arbitrary ODS within a display set shall be not smaller than PTS to be written in a preceding ODS.

Figure 11:
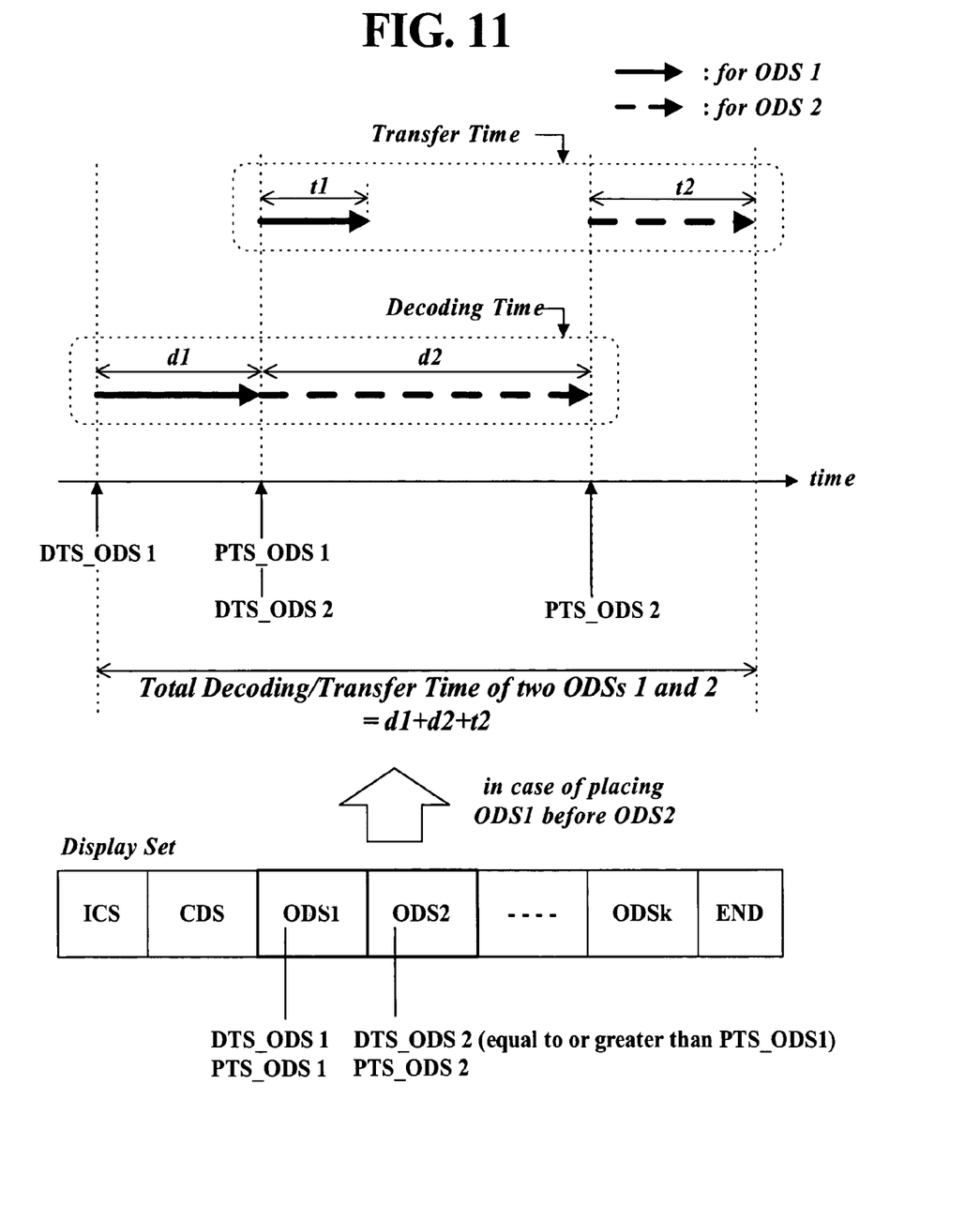
FIGS. 11 to 13 show comparatively object definition segment arranging methods in accordance with the present invention.

In the illustrated display set of FIG. 11 for providing user interfacing graphics, DTS and PTS are written such that DTS 'DTS_ODS2' of an ODS 2 is equal to PTS 'PTS_ODS1' of a preceding ODS 1, namely DTS_ODS2=PTS_ODS1. In the recording examples of a display set shown in FIGS. 12 and 13, DTS and PTS are written such that DTS 'DTS_ODS1' of the ODS 1 is equal to PTS 'PTS_ODS2' of the preceding ODS 2, namely DTS_ODS1=PTS_ODS2. Preferably, in the recording example of FIG. 11, the DTS_ODS2 is written greater than the PTS_ODS1, namely, DTS_ODS2>PTS_ODS1, and in the recording examples of FIGS. 12 and 13, the DTS_ODS1 is written greater than the PTS_ODS2, namely, DTS_ODS1>PTS_ODS2.

Figure 12:
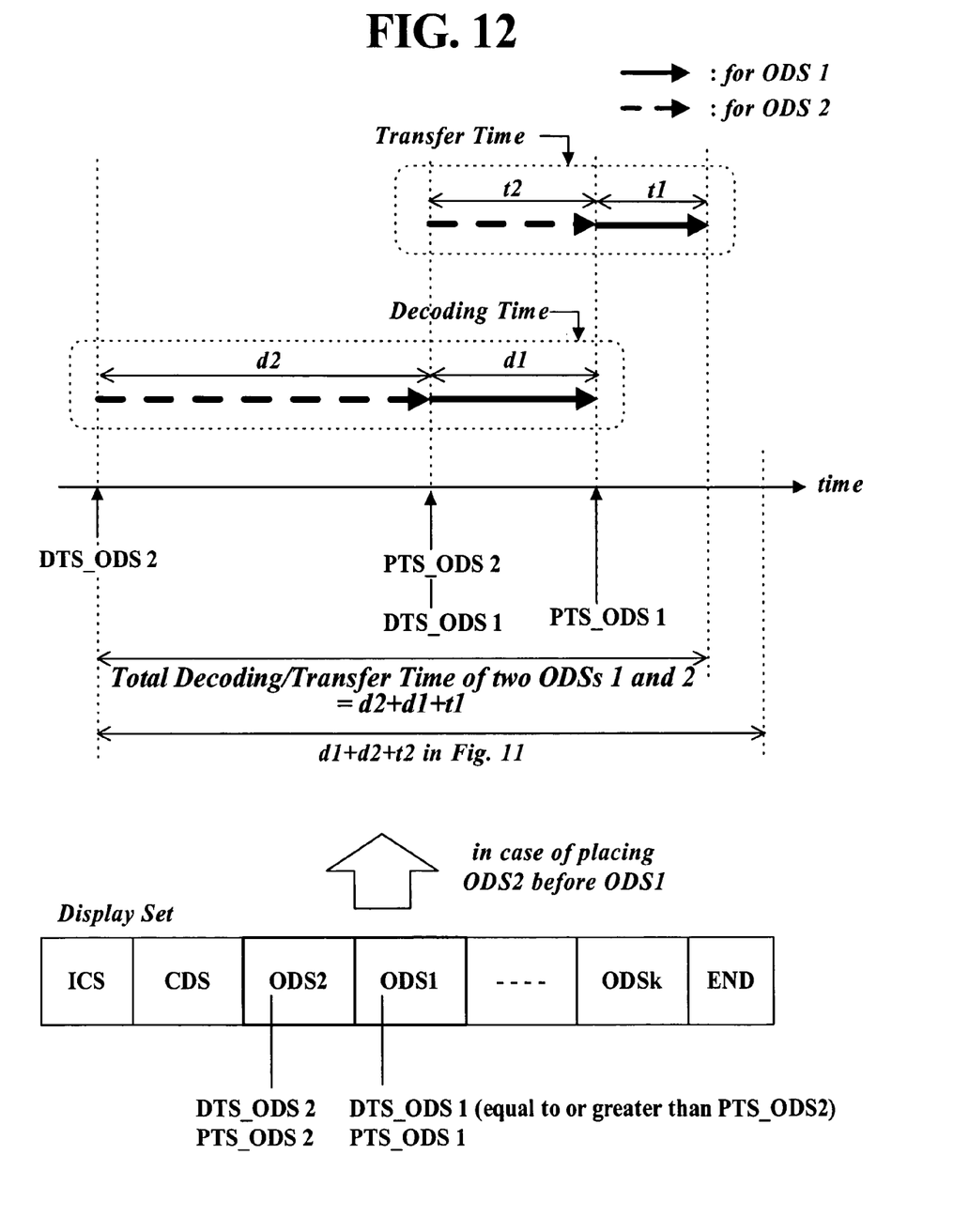
Figure 13:
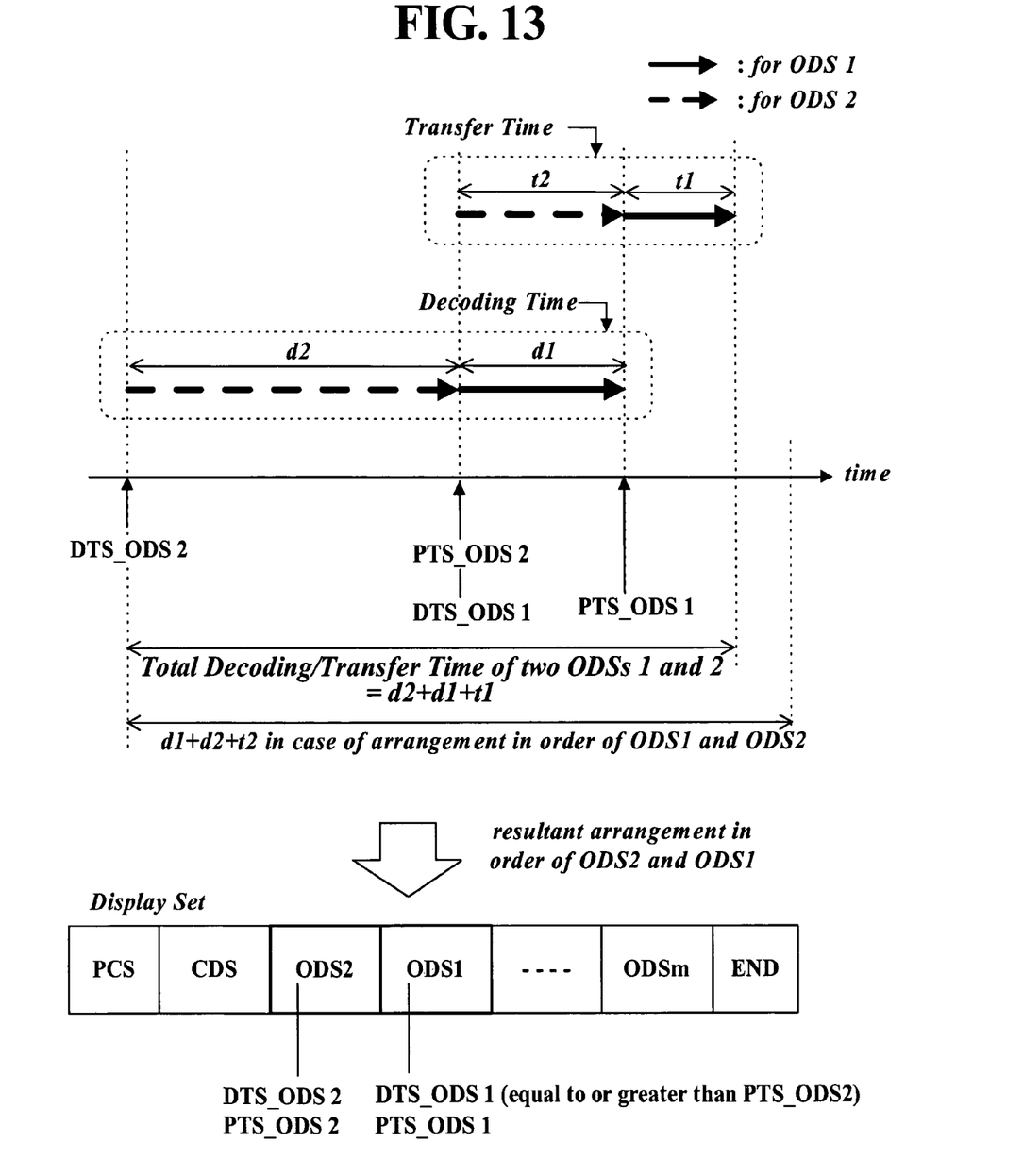

By the way, the DTS indicates when decoding is started and the PTS indicates when decoded graphic data is ready for presentation. Thus, the aforementioned DTS-PTS constraint ensures that decoding of graphic data in a following ODS is not started by the AV decoder 6 until decoding of graphic data in a preceding ODS is completed and stored in a bitmap buffer (not figured) for presentation ready. Accordingly, an optical disk apparatus including only one graphic decoder can conduct sequential decoding of ODSs satisfying the aforementioned DTS-PTS constraint without overflows.

After DTSs and PTSs are written in PES packets corresponding to ODSs in accordance with the above method of the present invention, the ODSs are arranged in a corresponding display set in accordance with the present invention. The followings are assumed for easy explanation of an ODS arranging method according to the present invention:

Two ODSs 1 and 2 pertaining to an arbitrary display set require decoding time d1 and d2, and transfer time t1 and t2, respectively;

The decoding time of an ODS is longer than its transfer time; and $d1<d2$ and $t1<t2$.

The transfer time is time length that need to complete transfer of decoded graphic data to a graphic buffer such as bitmap buffer.

Under the assumptions, if the two ODSs are arranged in order of ODS 1 and ODS 2 in a display set, as shown in FIG. 11, by the controller 10 of the disk recording/reproducing apparatus of FIG. 7, the total time to be taken to make the two ODSs presentation-ready is the sum of the ODS 1's decoding time d1, the ODS 2's decoding time d2 and the ODS 2's transfer time t2. That is "d1+d2+t2".

By the way, if order of the two ODSs is inverted as shown in FIG. 12, the total time for making the two ODSs presentation-ready is the sum of the ODS 2's decoding time d2, the ODS 1's decoding time d1 and the ODS 1's transfer time t1. That is "d2+d1+t1". Since $t1<t2$, "d2+d1+t1" is smaller than "d1+d2+t2". Thus, the arrangement proposed in FIG. 12 is able to reduce delay time to be taken for ODS presentation. The present invention adopts the ODS arrangement shown in FIG. 12.

If transfer time t2 of the ODS 2 was longer than decoding time d1 of the ODS 1, the total time to make the two ODSs presentation-ready would be "d2+t2+t1" not "d2+d1+t1". Even in this case, "d2+t2+t1" is smaller than "d1+d2+t2" in the arrangement of FIG. 11 because $t1<d1$. That is, the arrangement of FIG. 12 is also able to reduce delay time in comparison with the arranged case of FIG. 11.

Consequently, the controller 10 of the disk recording/reproducing apparatus of FIG. 7 places a longer-time ODS before others within a display set and then controls the drive 3 to record the thusly-arranged display set on a recording medium in accordance with the present invention. The longer-time ODS is one whose decoding and transfer time is longer than others'. The same arranging algorithm is applied to the remaining others before recording.

The above-explained DTS-PTS constraint and ODS arranging algorithm are also applicable to a display set for providing graphics not for user interfacing but for information display. FIG. 13 shows such a case.

In the embodiment of FIG. 13, the head is a PCS (Page Composition Segment), DTS-PTS relation of its succeeding two ODSs 1 and 2 is DTS_ODS2=PTS_ODS1, and decoding and transfer time of the ODS 2 is longer than that of the ODS 1, namely, $d2+t2>d1+t1$. Thus, the ODS 2 is placed before the ODS 1 in the display set shown in FIG. 13.

The present invention, disclosed with respect to a limited number of embodiments, displays a graphic page, e.g. a menu page including at least one object image after reading graphic data recorded on a recording medium, whereby, a user can know easily and rapidly screen change from main video to graphic plane.

In addition, the explained graphic data structure can reduce delay time in graphics presentation and makes it possible for an optical disk apparatus equipped with only one graphic decoder to conduct sequential decoding of ODSs without overflows.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

What is claimed is:

1. A recording medium having a data stream recorded thereon, the data stream comprising:
    a main data stream including at least one video data to be displayed on a display when read by a reader; and
    a graphic data stream being used for the recorded main data stream, the graphic data stream including at least one display set; the display set including at least one composition segment and at least two definition segments; and each definition segment including a decoding time stamp, a presentation time stamp and an identifier,
    wherein a decoding time stamp of a definition segment within the display set is equal to or greater than a presentation time stamp of a preceding definition segment of a different identifier within the display set, and
    wherein definition segments included in the display set are arranged such that, for every definition segment within the display set, a definition segment whose decoding and transfer time is relatively longer is placed before other definition segments whose decoding and transfer times are shorter.

2. The recording medium of claim 1, wherein each of the segments is organized to a single PES (Packetized Elementary Stream) packet.

3. The recording medium of claim 1, wherein the decoding time stamp indicates when decoding of graphic data included in each definition segment is started.

4. The recording medium of claim 1, wherein the presentation time stamp indicates when graphic data included in each definition segment is ready for presentation after being decoded.

5. The recording medium of claim 1, wherein the display set is to present graphics for user interfacing.

6. The recording medium of claim 1, wherein the display set is to present graphics for information providing.

7. The recording medium of claim 1, wherein the display set further includes another segment having color control information for graphic data included in the definition segments.

8. The recording medium of claim 1, wherein the different states of the same button include normal state, selected state, and activated state.

9. The recording medium of claim 1, wherein the interactive composition segment includes information of menu buttons to be displayed within a menu screen and the definition segments include data of the menu buttons, and the menu button information includes different object IDs for different states of the same button so that different data of the menu buttons correspond to different states of the same button.

10. A method for recording a data structure including at least video data stream on a recording medium, comprising:
    organizing a graphic data stream being used for the video data stream, the graphic data stream including at least one display set, the display set including at least one composition segment and at least two definition segments, each definition segment including a decoding time stamp, a presentation time stamp and an identifier; and
    recording the organized graphic data stream together with the video data stream on the recording medium,
    wherein a decoding time stamp of a definition segment in the display set being equal to or greater than a presentation time stamp of a preceding definition segment of a different identifier within the display set; and
    wherein definition segments included in the display set are arranged such that, for every definition segment within the display set, a definition segment whose decoding and transfer time is relatively longer is placed before other definition segments whose decoding and transfer times are shorter.

11. The method of claim 10, wherein each of the segments is organized to a single PES (Packetized Elementary Stream) packet.

12. The method of claim 10, wherein the composition segment includes information of menu buttons to be displayed within a menu screen, and the definition segments include image data of the menu buttons, and the menu button information includes different object IDs for different states of the same button so that different data of the menu buttons correspond to different states of the same button.

13. An apparatus for recording a data structure including at least graphic data stream on a recording medium, comprising:
    a recording device configured to record data on the recording medium;
    an encoder configured to encode the data; and
        a controller configured to control the encoder to encode a graphic data stream to successive packets of predetermined format, the graphic data stream including at least one display set, the display set including at least one composition segment and at least two definition segments, each definition segment including a decoding time stamp, a presentation time stamp and an identifier,
    wherein a decoding time stamp of a definition segment in the display set being equal to or greater than a presentation time stamp of a preceding definition segment of a different identifier within the display set and
    wherein definition segments included in the display set are arranged such that, for every definition segment within the display set, a definition segment whose decoding and transfer time is relatively longer is placed before other definition segments whose decoding and transfer times are shorter.

14. The apparatus of claim 13, wherein each of the segments is organized to a single PES (Packetized Elementary Stream) packet.

15. The apparatus of claim 13, wherein the composition segment includes information of menu buttons to be displayed within a menu screen, and the definition segments include image data of the menu buttons, and the menu button information includes different object IDs for different states of the same button so that different data of the menu buttons correspond to different states of the same button.

16. A method for reproducing a data structure including at least graphic data stream recorded on a recording medium, comprising:
    reading a graphic data stream recorded on the recording medium, the graphic data stream includes at least one display set, the display set includes at least one composition segment and at least two definition segments, each definition segment including a decoding time stamp, a presentation time stamp and an identifier, wherein definition segments included in the display set are arranged such that, for every definition segment within the display set, a definition segment whose decoding and transfer time is relatively longer is placed before other definition segments whose decoding and transfer times are shorter;

detecting successive two definition segments from the reproduced graphic data stream; and decoding and presenting each definition segment;

wherein a latter definition segment of the two definition segments is decoded after or simultaneously with beginning of presentation of the former definition segment of a different identifier within the display set.

17. The method of claim 16, wherein the composition segment is one of presentation composition segment and interactive graphic segment and the interactive composition segment includes information of menu buttons to be displayed within a menu screen.

18. The method of claim 17, wherein the menu button information includes different object IDs for different states of the same button so that different data of the menu buttons correspond to different states of the same button.

19. The method of claim 18, the definition segments include data of the menu buttons.

20. The method of claim 19, the menu button information includes different object IDs for different states of the same button so that different data of the menu buttons correspond to different states of the same button.

21. The method of claim 16, wherein each of the segments is organized to a single PES (Packetized Elementary Stream) packet.

22. An apparatus for reproducing a data structure including at least graphic data stream recorded on a recording medium, comprising:

a reproducing device configured to reproduce graphic data recorded on the recording medium, the graphic data stream including at least one display set, the display set including at least one of composition segment and at least two definition segments, each definition segment including a decoding time stamp, a presentation time stamp and an identifier, wherein definition segments included in the display set are arranged such that, for every definition segment within the display set, a definition segment whose decoding and transfer time is relatively longer is placed before other definition segments whose decoding and transfer times are shorter;

a decoder configured to decode the reproduced data; and a controller configured to detect successive two definition segments from the graphic data stream reproduced by the optical reproducing device, and configured to control the decoder to decode each definition segment, wherein the controller configured to start decoding of a latter definition segment of the two definition segments after or simultaneously with the beginning of presentation of the former definition segment of a different identifier within the display set.

23. The apparatus of claim 22, wherein the interactive composition segment includes information of menu buttons to be displayed within a menu screen.

24. The apparatus of claim 22, wherein each of the segments is organized to a single PES (Packetized Elementary Stream) packet.

25. The apparatus of claim 22, wherein the composition segment includes information of menu buttons to be displayed within a menu screen, and the definition segments include image data of the menu buttons, and the menu button information includes different object IDs for different states of the same button so that different data of the menu buttons correspond to different states of the same button.

* * * * *